United States Patent
Ferreira et al.

(10) Patent No.: US 12,209,223 B2
(45) Date of Patent: Jan. 28, 2025

(54) PROCESS FOR THE PRODUCTION OF FLUIDS

(71) Applicant: TOTALENERGIES ONETECH, Courbevoie (FR)

(72) Inventors: Cristina Ferreira, Paris (FR); Fabien Caudrelier, Paris la Defense (FR); Amine Benghalem, Levallois-Perret (FR)

(73) Assignee: TOTALENERGIES ONETECH, Courbevoie (FR)

( * ) Notice: Subject to any disclaimer, the term of this patent is extended or adjusted under 35 U.S.C. 154(b) by 80 days.

(21) Appl. No.: 18/006,658

(22) PCT Filed: Aug. 5, 2021

(86) PCT No.: PCT/EP2021/071881
§ 371 (c)(1),
(2) Date: Jan. 24, 2023

(87) PCT Pub. No.: WO2022/029234
PCT Pub. Date: Feb. 10, 2022

(65) Prior Publication Data
US 2023/0279302 A1   Sep. 7, 2023

(30) Foreign Application Priority Data
Aug. 7, 2020   (EP) .................................. 20305912

(51) Int. Cl.
*C10G 65/08*   (2006.01)
(52) U.S. Cl.
CPC ..... *C10G 65/08* (2013.01); *C10G 2300/1059* (2013.01); *C10G 2300/1096* (2013.01); *C10G 2300/301* (2013.01); *C10G 2300/304* (2013.01)

(58) Field of Classification Search
CPC .............. C10G 67/02; C10G 2300/202; C10G 2300/302; C10G 2300/304;
(Continued)

(56) References Cited

U.S. PATENT DOCUMENTS

| 2009/0166251 A1* | 7/2009 | Hantzer | C10G 45/04 208/58 |
| 2010/0279849 A1* | 11/2010 | Kuperman | C10G 45/04 502/154 |

(Continued)

FOREIGN PATENT DOCUMENTS

| DE | 2131227 A1 | 12/1972 | |
| EP | 3597725 A1 * | 1/2020 | ............. C10G 1/065 |

(Continued)

OTHER PUBLICATIONS

ISR-WO for parent application PCT/EP2021/071881 dated Oct. 28, 2021.

*Primary Examiner* — Randy Boyer
*Assistant Examiner* — Juan C Valencia
(74) *Attorney, Agent, or Firm* — Vorys, Sater, Seymour and Pease LLP

(57) ABSTRACT

The invention is a process for dearomatization and isomerization of a feedstock having less than or equal to 10 ppm by weight of sulphur, the process comprising:
Hydrodearomatizing the feedstock at a temperature ranging from 150 to 220° C. and at a pressure ranging from 20 to 150 bars, in order to provide a dearomatized product;
Hydroisomerizing the dearomatized product at a temperature ranging from 250 to 320° C. and at a pressure ranging from 40 to 60 bars in the presence of a catalyst based on platinum or palladium, in order to provide an isomerized product;

(Continued)

Hydrodearomatizing the isomerized product at a temperature ranging from 150 to 220° C. and at a pressure ranging from 20 to 150 bars, in order to provide an isomerized and dearomatized product.

16 Claims, 1 Drawing Sheet

(58) Field of Classification Search
CPC .......... C10G 2300/308; C10G 2400/04; C10G 2400/10; C10G 2400/14; C10G 65/08; C10G 2300/1059; C10G 2300/1096; C10G 2300/301; C10G 3/50; C10G 45/62; C10G 45/64; C10G 65/043; C10G 45/48; C10M 101/02; C10M 177/00; C10M 2203/1006; C10N 2070/00; Y02P 30/20

See application file for complete search history.

(56) References Cited

U.S. PATENT DOCUMENTS

| | | |
|---|---|---|
| 2012/0151828 A1 | 6/2012 | Kalnes |
| 2014/0042056 A1* | 2/2014 | Daage .................. C10G 67/16 |
| | | 208/60 |
| 2015/0218464 A1 | 8/2015 | Schleicher |
| 2016/0145511 A1 | 5/2016 | Xu |

FOREIGN PATENT DOCUMENTS

| | | | |
|---|---|---|---|
| WO | WO-2009131510 A1 * | 10/2009 | ............. C10L 1/026 |
| WO | 2020083997 A1 | 4/2020 | |
| WO | 2022/029234 A1 | 2/2022 | |

* cited by examiner

PROCESS FOR THE PRODUCTION OF FLUIDS

FIELD OF THE INVENTION

The invention relates to a process for the production of fluids from a feedstock having a low sulfur content.

BACKGROUND ART

Hydrocarbon fluids find widespread use as solvents such as in adhesives, cleaning fluids, explosives solvents, for decorative coatings and printing inks, light oils for use in applications such as metal extraction, metalworking or demoulding and industrial lubricants, and drilling fluids. The hydrocarbon fluids can also be used as extender oils in adhesives and sealant systems such as silicone sealants and as viscosity depressants in plasticised polyvinyl chloride formulations and as carrier in polymer formulation used as flocculants for example in water treatment, mining operations or paper manufacturing and also used as thickener for printing pastes. Hydrocarbon fluids may also be used as solvents in a wide variety of other applications such as chemical reactions.

The chemical nature and composition of hydrocarbon fluids varies considerably according to the use to which the fluid is to be put. Important properties of hydrocarbon fluids are the distillation range generally determined by ASTM D-86 or the ASTM D-1160 vacuum distillation technique used for heavier materials, flash point, density, aniline point as determined by ASTM D-611, aromatic content, sulphur content, viscosity, colour and refractive index.

These fluids tend to have narrow boiling point ranges as indicated by a narrow range between Initial Boiling Point (IBP) and Final Boiling Point (FBP) according to ASTM D-86. The Initial Boiling Point and the Final Boiling Point will be chosen according to the use to which the fluid is to be put. However, the use of the narrow cuts provides the benefit of a narrow flash point which is important for safety reasons. The narrow cut also brings important fluid properties such as a better defined aniline point or solvency power, then viscosity, and defined evaporation conditions for systems where drying is important, and finally better defined surface tension.

Fluids having a substantial amount of long paraffinic chains may exhibit poor cold properties.

One aim of the present invention is to provide a process for preparing specific fluids having satisfying cold properties, which process does not involve sulfurized catalyst and/or a feed having substantial amounts of sulphur. As a non-limiting example, the specific fluids obtained by the process of the invention can be used as a white oil or as a biological-origin fluid.

Another aim of the invention is to find a process, in which the catalysts are less sensitive to deactivation.

SUMMARY OF THE INVENTION

The invention provides a process for dearomatization and isomerization of a feedstock having less than or equal to 10 ppm by weight of sulphur, the process comprising:
   a) Hydrodearomatizing the feedstock at a temperature ranging from 150 to 220° C. and at a pressure ranging from 20 to 150 bars, in order to provide a dearomatized product;
   b) Hydroisomerizing the dearomatized product at a temperature ranging from 250 to 320° C. and at a pressure ranging from 40 to 60 bars in the presence of a catalyst based on platinum or palladium, in order to provide an isomerized product;
   c) Hydrodearomatizing the isomerized product at a temperature ranging from 150 to 220° C. and at a pressure ranging from 20 to 150 bars, in order to provide an isomerized and dearomatized product.

According to an embodiment, the feedstock comprises less than 5 ppm by weight, preferably less than 3 ppm by weight, more preferably less than 1 ppm by weight of sulphur.

According to an embodiment, the feedstock has an initial boiling point ranging from 120 to 300° C. and a final boiling point ranging from 310 to 600° C.

According to an embodiment, the feedstock has an aromatic content of from 500 ppm to 25% by weight, based on the total weight of the feedstock.

According to an embodiment, the hydrodearomatization steps a) and/or c) is/are performed in the presence of a catalyst selected from nickel, nickel tungstate, nickel molybdenum, molybdenum, cobalt molybdenate, nickel molybdenate on silica and/or alumina carriers or zeolites, preferably selected from nickel-based catalysts preferably supported on silica and/or alumina carrier.

According to an embodiment, the hydroisomerization step b) is performed in the presence of a catalyst selected from platinum and/or palladium catalysts supported on silica and/or alumina carriers or on zeolites.

According to an embodiment, step a) and/or step c) are performed until a conversion rate of the aromatic compounds of at least 95% by weight is reached.

According to an embodiment, step a) and/or step c) is/are performed at a temperature ranging from 160 to 210° C. and/or at a pressure ranging from 30 to 60 bars, preferably, steps a), b) and c) are performed at the same pressure.

According to an embodiment, step a), step b) and/or step c) is/are performed at a liquid hourly space velocity ranging from 0.4 to 3 hr-1, preferably from 0.5 to 1.5 hr-1, preferably steps a), b) and c) are performed at the same liquid hourly space velocity.

According to an embodiment, step a), step b) and/or step c) is/are performed in the presence of a catalyst that is not in a sulfided form when it is contacted with the feed.

According to an embodiment, the hydroisomerisation step b) is performed at a temperature ranging from 260 to 320° C., preferably from 270 to 310° C., more preferably from 275 to 300° C.

According to an embodiment, the process is performed in a unit comprising at least 3 reactors in series, at least one reactor wherein step a) is performed, at least one reactor wherein step b) is performed and at least one reactor wherein step c) is performed.

According to an embodiment, the process further comprises a fractionating step, preferably performed after the hydrodearomatization step c).

According to an embodiment, the isomerized and dearomatized product has an aromatic content below 1000 ppm by weight, preferably below 500 ppm by weight, more preferably below 300 ppm by weight, based on the total weight of the isomerized and dearomatized product.

According to an embodiment, the process is a process for manufacturing a white oil, said process comprising:
   a) Hydrodearomatizing a feedstock having an aromatic content of from 5 to 20% wt of aromatic compounds and having a pour point of more than 0° C. and having preferably an initial boiling point of at least 120° C. and a final boiling point of at least 300° C., at a temperature ranging from 150 to 210° C. and at a pressure ranging from 30 to 60 bars, in order to provide a dearomatized product having less than 750 ppm of aromatic content and having a pour point of more than 0° C.;

b) Hydroisomerizing the dearomatized product obtained at the end of the hydrodearomatizing step a) at a temperature ranging from 280 to 320° C. and at a pressure ranging from to 60 bars in the presence of a catalyst based on platinum or palladium, in order to provide an isomerized product having a pour point of less than −5° C. and having an initial boiling point below 100° C. and a final boiling point of at least 300° C., being understood that at least 20% by weight of the isomerized product has a boiling point of at least 300° C.;

c) Hydrodearomatizing the isomerized product obtained at the end of the hydroisomerizing step b) at a temperature ranging from 150 to 210° C. and at a pressure ranging from 30 to 60 bars, in order to provide an isomerized and dearomatized product having an aromatic content of less than 300 ppm and having a pour point of less than −5° C.;

d) Fractionating the isomerized and dearomatized product obtained at the end of the hydrodearomatizing step c) into at least two cuts, including one cut having an initial boiling point of at least 300° C., being understood that the white oil is the cut having an initial boiling point of at least 300° C. obtained at the end of step d).

An advantage of the present invention is that it does not involve the use sulphur, in particular process conditions do not involve the use sulphur while the feed comprises no sulphur or very low amount of sulphur. In particular, it can be implemented with a feed comprising less than 10 ppm by weight of sulphur and without the need of the addition of sulphur in order to pre-sulphide the catalysts.

Another advantage of the present invention is that the formation of polyaromatic compounds during the hydroisomerizing step and the accompanying exothermic reactions can be reduced thanks to the hydrodearomatizing step performed before the hydroisomerizing step. In such a process, the hydrodearomatizing step following the hydroisomerizing step can be performed without the need of severe conditions. Additionally, since the hydrodearomatizing reactions are exothermic, the feed for the hydroisomerising step is heated during the first hydrodearomatizing step, which reduces the heating needs for the hydroisomerising step.

Another advantage of the process including the three successive steps is that the first hydrodearomatization step allows to decrease or even avoid deactivation of the catalyst used for the hydroisomerization step.

Another advantage of the present invention is that the pressure can be substantially the same or even the same during the three steps a), b) and c) of the process of the invention. This allows a simple unit with three reactors in series in order to implement the process of the invention.

DESCRIPTION OF EMBODIMENTS OF THE INVENTION

Figure 1:
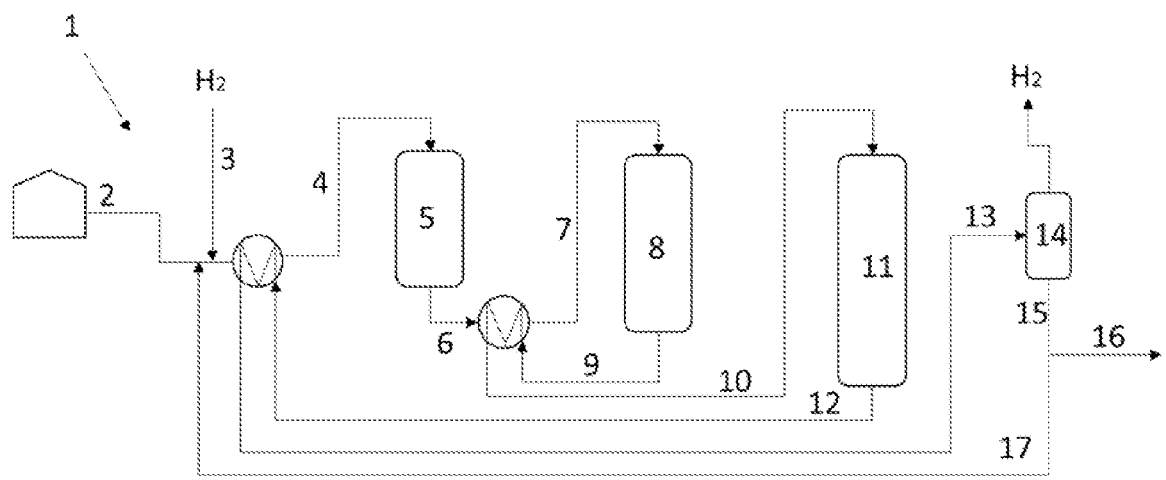
FIG. 1 describes an embodiment of an installation used in order to carry out the process of the invention.

The present invention relates to a process for dearomatization and isomerization of a feedstock, the process comprising:

a) Hydrodearomatizing a feedstock having less than or equal to 10 ppm by weight of sulphur at a temperature ranging from 150 to 220° C. and at a pressure ranging from 20 to 150 bars, in order to provide a dearomatized product;

b) Hydroisomerizing all or a part of the dearomatized product at a temperature ranging from 250 to 320° C. and at a pressure ranging from 40 to 60 bars in the presence of a catalyst based on platinum and/or palladium, in order to provide an isomerized product;

c) Hydrodearomatizing the isomerized product at a temperature ranging from 150 to 210° C. and at a pressure ranging from 20 to 150 bars, in order to provide an isomerized and dearomatized product.

According to an embodiment, steps a) and b) are successively performed without intermediate steps different from steps a) and b). More specifically, steps a) and b) are preferably successively performed without separation (or fractionation) step(s) between step a) and step b).

According to an embodiment, steps b) and c) are successively performed without intermediate steps different from steps b) and c) and different from a flash separation removing gas or liquid compounds having less than 5 carbon atoms. More specifically, steps b) and c) are preferably successively performed without distillation step(s) between step b) and step c).

Alternatively, according to another embodiment, between step b) and step c), a flash separation is present in order to remove light gas, i.e. compounds having less than 5 carbon atoms.

A final fractionation after step c) can be implemented in order to obtain the desired cuts, the final fractionation can be performed directly at the outlet of the hydrodearomatization step c) and/or after one or several flash separations themselves performed at the outlet of the hydrodearomatization step c).

Within the meaning of the present invention, the terms "hydrodearomatization" and "dearomatization" have the same meaning.

Within the meaning of the present invention, the terms "hydroisomerization" and "isomerization" have the same meaning.

Feedstock (Also Named "Feed"):

The feedstock typically comprises less than 10 ppm by weight of sulphur, preferably less than ppm by weight, more preferably less than 3 ppm by weight, even more preferably less than 1 ppm by weight. The sulphur content can be measured according to ASTM D2622 standard using X-ray Fluorescence.

The feed typically has an initial boiling point (IBP) ranging from 50 to 300° C. and a final boiling point (FBP) ranging from 310 to 600° C. The IBP and FBP can be measured according to ASTM D86 standard and/or ASTM D1160 standard. ASTM D1160 standard is used to measure boiling points above 400° C. The boiling range, i.e. the difference between the FBP and the IBP, preferably ranges from 100 to 400° C., preferably from 150 to 350° C.

According to an embodiment, the feed has a boiling range within the range of 150-450° C., preferably of 170-400° C., i.e. the initial and the final boiling point are preferably within the range of 150-450° C. or 170-400° C. This embodiment is particularly useful if the feedstock is a petroleum cut.

According to another embodiment particularly useful if the feedstock is of biologic origin (and not of petroleum origin), named in the present invention "biologic cut", the feed has a boiling range within the range of 50-400° C., preferably of 50-350° C.

The feed typically has a viscosity at 40° C. of at least 2.0 mm$^2$/s, preferably at least 2.5 mm$^2$/s. The viscosity can be measured according to ASTM D445 standard.

According to an embodiment of the invention, the feedstock has an aromatic content ranging from 500 ppm to 20% by weight, based on the total weight of the feedstock. More specifically, for feedstock of biological origin, the aromatic content preferably ranges from 500 ppm to 5% by weight, preferably from 1000 ppm to 2% by weight, based on the total weight of the feedstock, and for feedstock of petroleum origin, the aromatic content preferably ranges from 5 to 20% by weight, preferably from 7 to 20% by weight, based on the total weight of the feedstock. The aromatic content can be measured by UV spectrometry for amounts of aromatics lower than 350 ppm and by HPLC (IP391 standard) for amounts of aromatics of 350 ppm or more.

According to an embodiment of the invention, the feedstock has a density at 15° C. ranging from 0.7000 to 0.8500 g/mL, preferably from 0.7400 to 0.8400 g/mL. The density at 15° C. can be measured according to ISO 12185 standard.

According to another embodiment particularly useful if the feedstock is a petroleum cut, the feed has a density at 15° C. ranging from 0.8000 to 0.8500 g/mL, preferably from 0.8100 to 0.8400 g/mL.

According to another embodiment particularly useful if the feedstock is a biologic cut (biologic origin), the feed has a density at 15° C. ranging from 0.7500 to 0.8100 g/mL, preferably from 0.7600 to 0.800 g/mL.

According to an embodiment of the invention, the feedstock has a pour point of less than −20° C., preferably less than −25° C. The pour point can be measured according to ASTM D5950.

According to an embodiment particularly useful if the feedstock is a petroleum cut, the feed has a pour point of less than 15° C., preferably less than 10° C.

According to another embodiment particularly useful if the feedstock is a biologic cut (biologic origin), the feed has a pour point of less than 10° C., preferably more than 5° C.

The feed may be selected from petroleum cuts originating from oil refining cuts (petroleum cuts) or biologic cuts originating from hydrodeoxygenation followed by isomerization of a biomass. In accordance with the invention, typical refinery feedstocks can be of any type, including feedstocks originating from a distillate hydrocracker unit, but also feedstocks with high contents of aromatics such as conventional ultra-low sulphur diesel feedstocks, heavy diesel or fuels intended for aviation, or also particular fractions of these feedstocks.

Refinery feedstocks can be hydrocracked in order to obtain short and simple molecules by the addition of hydrogen at high pressure in the presence of a catalyst. Descriptions of hydrocracking processes are provided in Hydrocarbon Processing (November 1996, pages 124 to 128), in Hydrocracking Science and Technology (1996) and in U.S. Pat. Nos. 4,347,124, 4,447,315 and WO-A-99/47626.

Within the meaning of the present invention, a biologic feed or biologic cut should be distinguished from petroleum cut or oil refining cut. The biologic cut used in the invention is typically biodegradable and in particular the biologic cut is typically readily biodegradable (i.e. has a biodegradability at 28 days of at least 60% according to standard OECD 306).

The biologic feed can be obtained from an HDO/ISO process. This HDO/ISO process is applied on biological raw materials, the biomass, which can be selected from the group consisting of vegetable oils, animal fats, fish oils, and mixtures thereof. Suitable vegetable raw materials include rapeseed oil, canola oil, colza oil, tall oil, sunflower oil, soybean oil, hemp oil, olive oil, linenseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Condensation products, esters, or other derivatives obtained from biological raw materials may also be used as starting materials. An especially preferred vegetable raw material is an ester or triglyceride derivative. This material is submitted to an hydrodeoxygenation (HDO) step for decomposing the structure of the biological ester or triglyceride constituent, and for removing oxygen, phosphorus and sulfur (part of) compounds, concurrently hydrogenating the olefinic bonds, followed by isomerization of the product thus obtained, thus branching the hydrocarbon chain and improving the low temperature properties of the thus-obtained feedstock. Various HDO/ISO processes are disclosed in the literature. WO2014/033762 discloses a process which comprises a pre-hydrogenation step, a hydrodeoxygenation step (HDO) and an isomerization step which operates using the countercurrent flow principle. EP1728844 describes a process for the production of hydrocarbon components from mixtures of a vegetable or animal origin. The process comprises a pretreatment step of the mixture of a vegetable origin for removing contaminants, such as, for example, alkaline metals salts, followed by a hydrodeoxygenation (HDO) step and an isomerization step. EP2084245 describes a process for the production of a hydrocarbon mixture that can be used as diesel fuel or diesel component by the hydrodeoxygenation of a mixture of a biological origin containing fatty acid esters possibly with aliquots of free fatty acids, such as for example vegetable oils such as sunflower oil, rape oil, canola oil, palm oil, or fatty oils contained in the pulp of pine trees (tall oil), followed by hydroisomerization on specific catalysts. EP2368967 discloses such a process and the thus-obtained product.

According to a particular embodiment, the feed is a biologic cut having biodegradability at 28 days of at least 60%, as measured according to the OECD 306 standard, preferably at least 70% by weight, more preferably at least 75% and advantageously at least 80%, as measured according to the OECD 306 standard.

According to a preferred embodiment, the feed is selected from hydrocracked gas oil cuts (petroleum origin) and biologic cuts (biological origin).

The process of the invention can also comprise a step of providing a feed as defined in the present invention.

According to an embodiment, if the isomerized and dearomatized product obtained at the end of the process is intended to be a biological-origin fluid, preferably, the feedstock of the process of the invention will be a biologic cut having boiling points within the range from 50 to 350° C. and a pour point of less than 10° C.

According to an embodiment, if the isomerized and dearomatized product obtained at the end of the process is intended to be a white oil, preferably, the feedstock of the process of the invention will be a hydrocracked gas oil cuts having boiling points within the range from 240 to 400° C. and a pour point of less than 15° C.

Step a: Hydrodearomatization Step

The feedstock as defined above is hydrodearomatized in a step a). The feedstock can optionally be pre-fractionated.

Hydrogen that is used in the hydrodearomatization unit is typically a high purity hydrogen, e.g. with a purity of more than 99%, albeit other grades can be used.

This step a) of the process of the invention can take place in one or more reactors. The reactor can comprise one or more catalytic beds. Catalytic beds are usually fixed beds.

It is also possible that the reactor wherein step a) is implemented be made of twin reactors operated alternatively in a swing mode. This may be useful for catalyst charging and discharging: since the reactor may comprise the catalyst that is poisoned first (substantially all the sulphur is trapped in and/or on the catalyst) it should be changed often.

Hydrodearomatization takes place using a catalyst. Typical hydrodearomatization catalysts include but are not limited to: nickel, platinum, palladium, rhenium, rhodium, nickel tungstate, nickel molybdenum, molybdenum, cobalt molybdenate, nickel molybdenate on silica and/or alumina carriers or zeolites. A preferred catalyst is Ni-based and is supported on an alumina carrier, having preferably a specific surface area varying between 100 and 200 m$^2$/g of catalyst. According to a particular embodiment, the catalyst consists in nickel as metallic compound.

The hydrodearomatization conditions are typically the following:
- Pressure: 20 to 150 bars, preferably 30 to 120 bars, and most preferably 40 to 70 bars;
- Temperature: 150 to 220° C., preferably 170 to 220° C. and most preferably 180 to 210° C.;
- Liquid hourly space velocity (LHSV): 0.2 to 5 hr$^{-1}$, preferably 0.4 to 3, and most preferably 0.5 to 2;
- Hydrogen treat rate: adapted to the above conditions, which can range from 100 to 650 Nl/l of feed.

According to a particular embodiment, the pressure ranges from 20 to 70 bars and the temperature ranges from 180 to 210° C. during the dearomatizing step a).

A recycle loop can be present in order to recycle a part of the product exiting the reactor of the second hydrodearomatization step c) at the entry of the reactor of the first hydrodearomatization step a). This recycling loop allows diluting the feedstock defined above in the invention. If such a dilution is performed, the dilution rate can range from 20% to 75%, preferably from 30 to 65%, more preferably from 40 to 60%.

According to a preferred embodiment, hydrodearomatization step a) is performed in one or two reactors, using one or two catalyst beds per reactor, preferably one fixed bed catalyst. Preferably, hydrodearomatization step a) is performed at a temperature ranging from 170 to 220° C. and at a pressure ranging from 30 to 60 bars.

Advantageously, hydrodearomatization step a) is performed under the conditions mentioned above until dearomatized fluids with a very low content of aromatics, preferably less than 1000 ppm by weight, preferentially less than 750 ppm by weight and more preferentially less than 500 ppm by weight, are obtained.

The dearomatized product has an aromatic content that is lower than the aromatic content of the feedstock (before step a)). Advantageously, hydrodearomatization is performed under the conditions mentioned above until a conversion rate of the aromatic compounds comprised between 95 and 100%, preferably between 98 and 99.99%, is obtained.

The hydrodearomatization step can be followed by measuring the aromatic content by UV spectrometry or by high performance liquid chromatography (HPLC). HPLC is preferably used when the aromatic amount is higher than 0.1% wt, alternatively, samples can be diluted in order to be able to measure the aromatic content by UV spectrometry when the aromatic content of the samples is too high.

The dearomatized feed has substantially the same initial boiling point and the same final boiling point as the feed (before dearomatization), as well as substantially the same density. Thus, preferably, the dearomatized product has an initial and a final boiling point within the range of 150-450° C. or 170-400° C.

Step b): Hydroisomerization Step

All or part of, preferably all, the dearomatized product obtained in the end of step a) is hydroisomerized. Preferably, all the dearomatized product obtained in the end of step a) is hydroisomerized since preferably there is no fractionation step between step a) and step b).

Hydrogen that is used in the hydroisomerization unit is typically a high purity hydrogen, e.g. with a purity of more than 99%, albeit other grades can be used.

This step b) of the process of the invention can take place in one or more reactors. The reactor can comprise one or more catalytic beds. Catalytic beds are usually fixed beds.

According to an embodiment, hydroisomerization takes place using a catalyst selected from platinum-based catalyst, palladium-based catalyst and platinum and palladium-based catalyst. Hydroisomerization catalysts include but are not limited to: platinum and palladium catalysts on silica and/or alumina carriers or on zeolites.

Typically, the catalyst used in step b) is not presulfided before contact with the dearomatized product obtained at the end of step a).

The hydroisomerization conditions are typically the following:
- Pressure: 40 to 60 bars, preferably 40 to 55 bars, and most preferably 40-50 bars;
- Temperature: 250 to 320° C., preferably 270 to 310° C. and most preferably 280 to 310° C.;
- Liquid hourly space velocity (LHSV): 0.2 to 5 hr', preferably 0.4 to 3, and most preferably 0.5 to 1.5;
- Hydrogen treat rate: adapted to the above conditions, which can range from 100 to about 650 Nl/l of feed.

According to a preferred embodiment, hydroisomerization step b) is performed in one reactor, using one or more catalytic beds, preferably one fixed bed catalyst. Preferably, hydroisomerization step b) is performed at a temperature ranging from 280 to 310° C. and at a pressure ranging from 40 to 60 bars.

Advantageously, hydroisomerization step b) is performed under the conditions mentioned above until the pour point of the products has been lowered by at least 5° C., preferably by at least 8° C., more preferably by at least 10° C. This embodiment means that the difference between the pour point of the isomerized product (after step b)) and the pour point of the dearomatized product (before step b)) is preferably of at least 5° C., more preferably of at least 8° C., even more preferably of at least 10° C. or of at least 20° C.

Advantageously, the isoparaffin/n-paraffin weight ratio of the dearomatized product (before hydroisomerization) ranges from 1 to 10, preferably from 1.5 to 5 and the isoparaffin/n-paraffin weight ratio of the dearomatized and isomerized product (after hydroisomerization) ranges from 3 to 20, preferably from 5 to 15, being noted that the hydrodearomatization step increases the isoparaffin/n-paraffins weight ratio. Preferably, the increase of the isoparaffins/n-paraffins weight ratio is an increase of a factor of at least 2, preferably of at least 2.5.

The amount of isoparaffins and n-paraffins can be determined by gas chromatography, in particular by a two-dimensional gas chromatography.

Advantageously, when the initial feed is a petroleum cut, hydroisomerization is performed under the conditions mentioned above until at least 20% wt of the isomerized products has an initial boiling point of at least 300° C., preferably at least 25% wt of the isomerized products has an initial boiling point of at least 300° C. This embodiment means that the hydroisomerization step is performed in such a manner that the yield in white oil (i.e. the cut boiling at a temperature of at least 300° C.) should be maintained at a suitable level.

The hydroisomerization step is performed in such a manner that the cracking reactions are limited. Limitation of hydrocracking reactions can be illustrated by the fact that the final boiling point of the isomerized product is not substantially reduced.

The isomerized fluid typically has an initial boiling point that is lower than the initial boiling point of the dearomatized product that entered the hydroisomerization reactor.

According to a preferred embodiment, the isomerized fluid has an initial boiling point within the range of from 50 to 200° C.

According to an embodiment, the isomerized fluid has an initial boiling point and a final boiling point within the range from 50 to 400° C., preferably from 60 to 375° C.

According to an embodiment particularly useful if the feedstock is a petroleum cut, the isomerized fluid has a final boiling point of at least 300° C. Preferably, according to this embodiment, at least 30% by weight, preferably at least 50% by weight, of the isomerized fluid has a final boiling point of at least 300° C.

According to another embodiment particularly useful if the feedstock is a biologic cut (biologic origin), the isomerized fluid has a final boiling point ranging from 270 to 330° C., preferably from 280 to 320° C.

The isomerized fluid generally has an aromatic content that is higher than the aromatic content of the dearomatized product (after step a) and before step b)). For example, the aromatic content of the isomerized product can comprise from 500 to 4000 ppm of aromatic compounds or from 750 to 3500 ppm or even from 1000 to 3000 ppm of aromatic compounds, based on the total weight of the isomerized product.

Step c: Hydrodearomatization Step

All or part of, preferably all, the isomerized product obtained at the end of step b) is then hydrodearomatized. Preferably, all the isomerized product obtained at the end of step b) is hydrodearomatized since preferably there is no fractionation step between step b) and step c).

Hydrogen that is used in the hydrodearomatization unit is typically a high purity hydrogen, e.g. with a purity of more than 99%, albeit other grades can be used.

This step c) of the process of the invention can take place in one or more reactors. The reactor can comprise one or more catalytic beds. Catalytic beds are usually fixed beds.

Hydrodearomatization takes place using a catalyst. Typical hydrodearomatization catalysts include but are not limited to: nickel, platinum, palladium, rhenium, rhodium, nickel tungstate, nickel molybdenum, molybdenum, cobalt molybdenate, nickel molybdenate on silica and/or alumina carriers or zeolites. A preferred catalyst is Ni-based and is supported on an alumina carrier, having preferably a specific surface area varying between 100 and 200 m$^2$/g of catalyst. According to a particular embodiment, the catalyst consists in nickel as metallic compound.

The hydrodearomatization conditions are typically the following:
Pressure: 20 to 150 bars, preferably 30 to 120 bars, and most preferably 40 to 70 bars;
Temperature: 150 to 220° C., preferably 170 to 220° C. and most preferably 180 to 210° C.;
Liquid hourly space velocity (LHSV): 0.2 to 5 hr$^{-1}$, preferably 0.4 to 3, and most preferably 0.5 to 1.5;
Hydrogen treat rate: adapted to the above conditions, which can range from 100 to about 650 Nl/l of feed.

According to a particular embodiment, the pressure ranges from 20 to 70 bars and the temperature ranges from 180 to 210° C. during the hydrodearomatizing step c).

Preferably, the hydrogen treat rate will be identical for the three steps a), b) and c).

According to an embodiment, hydrodearomatization step c) is performed in one reactor, using one or more catalytic beds, preferably one fixed bed catalyst.

Preferably, hydrodearomatization step c) is performed at a temperature ranging from 160 to 210° C. and at a pressure ranging from 30 to 60 bars.

According to a preferred embodiment, the hydrodearomatization step c) is performed in the presence of the same catalyst as the hydrodearomatization step a).

Advantageously, hydrodearomatization step c) is performed under the conditions mentioned above until dearomatized fluids with a very low content of aromatics, preferably less than 300 ppm by weight, preferentially less than 100 ppm by weight, are obtained.

Advantageously, hydrodearomatization step c) is performed under the conditions mentioned above until a conversion rate of the aromatic compounds comprised between 90 and 100%, preferably between 95 and 99.99%, is obtained.

The hydrodearomatization step c) can be followed by measuring the aromatic content by UV spectrometry At the end of step c), an isomerized and dearomatized product is obtained.

According to a preferred embodiment, the isomerized and dearomatized product has an initial boiling point within the range of from 50 to 200° C.

According to an embodiment, the isomerized and dearomatized product has an initial boiling point and a final boiling point within the range from 50 to 400° C., preferably from 60 to 375° C.

According to an embodiment particularly useful if the feedstock is a petroleum cut, the isomerized and dearomatized product has a final boiling point of at least 300° C. Preferably, according to this embodiment, at least 30% by weight, preferably at least 50% by weight of the isomerized and dearomatized product has a final boiling point of at least 300° C.

According to another embodiment particularly useful if the feedstock is a biologic cut (biologic origin), the isomerized and dearomatized product has a final boiling point ranging from 270 to 330° C., preferably from 280 to 320° C.

Three-Step Process of the Invention

The process of the invention is carried out in at least three steps, preferably in at least three separate reactors, preferable at least one reactor for step a), at least one reactor for step b) and at least one reactor for step c). As an example, the process can be carried out in one or two reactors for step a), in one reactor for step b) and one, two or three reactors for step c).

It may be necessary to insert quenches on the recycle to cool effluents between the reactors or catalytic beds to control reaction temperatures and consequently thermal equilibrium of the hydrogenation reaction.

In case the process makes use of 3 reactors, the first reactor will generally act as a sulphur trap. This first reactor will thus trap substantially all the sulphur. The catalyst may thus be saturated if accumulated sulphur is trapped during the complete cycle of the catalyst and the catalyst may thus be renewed from time to time. Coke formation may also lead to the deactivation of the catalyst. When regeneration or rejuvenation is not possible for such saturated catalyst the first reactor is considered as a sacrificial reactor which size and catalyst content both depend on the catalyst renewal frequency.

In an embodiment the resulting isomerized and dearomatized product and/or separated gas is/are partly recycled to the inlet of the hydrodearomatization step a). This dilution helps, if this were to be needed, maintaining the exothermicity of the reaction within controlled limits, especially at the first step a). Recycling also allows heat-exchange before the reaction and also a better control of the temperature.

The stream exiting the hydrodearomatization unit of step c) contains the isomerized and dearomatized product and hydrogen. Flash separators are used to separate effluents into gas, mainly remaining hydrogen, and liquids, mainly isomerized and dearomatized hydrocarbons. The process can be carried out using three flash separators, one of high pressure, one of medium pressure, and one of low pressure, very close to atmospheric pressure.

The hydrogen gas that is collected on top of the flash separators can be recycled to the inlet of the hydrodearomatization unit wherein step a) is implemented or at different levels between the reactors in the units wherein steps a), b) and c) are performed.

Because the final separated product is at about atmospheric pressure, it is possible to feed directly the optional fractionation stage, which is preferably carried out under vacuum pressure that is at about between 10 mbars to 1 bar.

The optional fractionation stage can be operated such that various hydrocarbon fluids can be withdrawn simultaneously from the fractionation column, and the boiling range of which can be predetermined.

Therefore, fractionation can take place before step a) of the process, after step c) of the process, or both.

Fractionation can be carried out in such a way that it is simultaneously possible for various hydrocarbon-containing fluids to be removed from the fractionation column and for their boiling point to be predetermined. A distillation column establishes the separation of mixtures with several liquid/vapour equilibrium stages with at least 3 stages. For a given mixture, the closer the boiling points of the compounds, the higher the number of separation stages. It is also possible to perform the fractionation through several distillation columns.

The hydrodearomatization and hydroisomerization reactors, the separators and the fractionation unit can thus be connected directly, without having to use intermediate tanks. By adapting the feed, especially the initial and final boiling points of the feed, it is possible to produce directly, without intermediate storage tanks, the final products with the desired initial and final boiling points. Moreover, this integration of hydrodearomatization and hydroisomerization and fractionation allows an optimized thermal integration with reduced number of equipment and energy savings.

According to an embodiment of the invention, the process comprises successively:
  a) Hydrodearomatizing a feedstock having an aromatic content of from 0.1 to 20% wt of aromatic compounds and having a pour point of less than 15° C. and having preferably an initial boiling point of at least 120° C. and a final boiling point of at least 250° C., at a temperature ranging from 150 to 220° C. and at a pressure ranging from 30 to 150 bars, in order to provide a dearomatized product having less than 750 ppm of aromatic content and having a pour point of less than 15° C.;
  b) Hydroisomerizing the dearomatized product obtained at the end of the hydrodearomatizing step a) at a temperature ranging from 275 to 320° C. and at a pressure ranging from to 60 bars in the presence of a catalyst based on platinum or palladium, in order to provide an isomerized product having a pour point of less than −5° C. and having an initial boiling point below 120° C. and a final boiling point of at least 250° C.;
  c) Hydrodearomatizing the isomerized product obtained at the end of the hydroisomerizing step b) at a temperature ranging from 150 to 210° C. and at a pressure ranging from 30 to 150 bars, in order to provide an isomerized and dearomatized product having an aromatic content of less than 300 ppm and having a pour point of less than −5° C.; optionally d) fractionating the isomerized and dearomatized product obtained at the end of the hydrodearomatizing step c) into at least two cuts, preferably a cut having an initial boiling point of at least 300° C. and a cut having a final boiling point of less than 300° C.

According to an embodiment of the invention, the process comprises successively:
  a) Hydrodearomatizing a feedstock having an aromatic content of from 0.1 to 20% wt of aromatic compounds and having a pour point of less than 10° C. and having preferably an initial boiling point of at least 120° C. and a final boiling point of at least 300° C., at a temperature ranging from 150 to 220° C. and at a pressure ranging from 30 to 60 bars, in order to provide a dearomatized product having less than 750 ppm of aromatic content and having a pour point of less than 10° C.;
  b) Hydroisomerizing the dearomatized product obtained at the end of the hydrodearomatizing step a) at a temperature ranging from 275 to 320° C. and at a pressure ranging from to 60 bars in the presence of a catalyst based on platinum or palladium, in order to provide an isomerized product having a pour point of less than −5° C. and having an initial boiling point below 120° C. and a final boiling point of at least 280° C.;
  c) Hydrodearomatizing the isomerized product obtained at the end of the hydroisomerizing step b) at a temperature ranging from 150 to 210° C. and at a pressure ranging from 30 to 60 bars, in order to provide an isomerized and dearomatized product having an aromatic content of less than 300 ppm and having a pour point of less than −5° C.;
  optionally d) fractionating the isomerized and dearomatized product obtained at the end of the hydrodearomatizing step c) into at least two cuts, preferably a cut having an initial boiling point of at least 300° C. and a cut having a final boiling point of less than 300° C.

According to an embodiment of the invention, the process consists successively in:
  a) Hydrodearomatizing a feedstock having an aromatic content of from 0.1 to 20% wt of aromatic compounds and having a pour point of less than 15° C. and having preferably an initial boiling point of at least 120° C. and a final boiling point of at least 250° C., at a temperature ranging from 150 to 220° C. and at a pressure ranging from 30 to 150 bars, in order to provide a dearomatized product having less than 750 ppm of aromatic content and having a pour point of less than 15° C.;
b) Hydroisomerizing the dearomatized product obtained at the end of the hydrodearomatizing step a) at a temperature ranging from 275 to 320° C. and at a pressure ranging from to 60 bars in the presence of a catalyst based on platinum or palladium, in order to provide an isomerized product having a pour point of less than −5° C. and having an initial boiling point below 120° C. and a final boiling point of at least 250° C.;
c) Hydrodearomatizing the isomerized product obtained at the end of the hydroisomerizing step b) at a temperature ranging from 150 to 210° C. and at a pressure ranging from 30 to 150 bars, in order to provide an isomerized and dearomatized product having an aromatic content of less than 300 ppm and having a pour point of less than −5° C.;
optionally d) fractionating the isomerized and dearomatized product obtained at the end of the hydrodearomatizing step c) into at least two cuts, preferably a cut having an initial boiling point of at least 300° C. and a cut having a final boiling point of less than 300° C.

According to an embodiment, the process is a process for manufacturing a white oil and the process of the invention comprises successively, preferably consists successively in:
a) Hydrodearomatizing a feedstock having an aromatic content of from 5 to 20% wt of aromatic compounds and having a pour point of less than 10° C. and having preferably an initial boiling point of at least 120° C. and a final boiling point of at least 300° C., at a temperature ranging from 150 to 210° C. and at a pressure ranging from 30 to 150 bars, in order to provide a dearomatized product having less than 750 ppm of aromatic content and having a pour point of less than 10° C.;
b) Hydroisomerizing the dearomatized product obtained at the end of the hydrodearomatizing step a) at a temperature ranging from 280 to 320° C. and at a pressure ranging from to 60 bars in the presence of a catalyst based on platinum or palladium, in order to provide an isomerized product having a pour point of less than −5° C. and having an initial boiling point below 120° C. and a final boiling point of at least 300° C., being understood that at least 20% by weight of the isomerized product has an initial boiling point of at least 300° C.;
c) Hydrodearomatizing the isomerized product obtained at the end of the hydroisomerizing step b) at a temperature ranging from 150 to 210° C. and at a pressure ranging from 30 to 150 bars, in order to provide an isomerized and dearomatized product having an aromatic content of less than 300 ppm and having a pour point of less than −5° C.;
d) Fractionating the isomerized and dearomatized product obtained at the end of the hydrodearomatizing step c) into at least two cuts, including one cut having an initial boiling point of at least 300° C., being understood that the white oil is the cut having an initial boiling point of at least 300° C. obtained at the end of step d).

According to an embodiment, the process is a process for manufacturing a biological-origin fluid and the process of the invention comprises successively, preferably consists successively in:
a) Hydrodearomatizing a feedstock having an aromatic content of from 1000 ppm to 2% by weight of aromatic compounds and having a pour point of less than 5° C. and having preferably an initial boiling point of at least 50° C. and a final boiling point of at least 300° C., at a temperature ranging from 150 to 210° C. and at a pressure ranging from 30 to 120 bars, in order to provide a dearomatized product having less than 900 ppm of aromatic content and having a pour point of less than 5° C.;
b) Hydroisomerizing the dearomatized product obtained at the end of the hydrodearomatizing step a) at a temperature ranging from 280 to 320° C. and at a pressure ranging from 40 to 60 bars in the presence of a catalyst based on platinum or palladium, in order to provide an isomerized product having a pour point of less than −10° C. and having an initial boiling point below 80° C. and a final boiling point of at least 300° C., being understood that at least 50% by weight of the isomerized product has an initial boiling point of at least 140° C.;
c) Hydrodearomatizing the isomerized product obtained at the end of the hydroisomerizing step b) at a temperature ranging from 150 to 210° C. and at a pressure ranging from 30 to 120 bars, in order to provide an isomerized and dearomatized product having an aromatic content of less than 200 ppm and having a pour point of less than −10° C.;
d) Fractionating the isomerized and dearomatized product obtained at the end of the hydrodearomatizing step c) into at least two cuts, including one cut having an initial boiling point of at least 140° C., being understood that the biological-origin fluid is the cut having an initial boiling point of at least 140° C. obtained at the end of step d).

According to an embodiment, the process is a process for manufacturing a biological-origin fluid and the process of the invention comprises successively, preferably consists successively in:
a) Hydrodearomatizing a feedstock having an aromatic content of from 1000 ppm to 2% by weight of aromatic compounds and having a pour point of less than 10° C. and having preferably an initial boiling point of at least 50° C. and a final boiling point of at least 300° C., at a temperature ranging from 150 to 210° C. and at a pressure ranging from 30 to 60 bars, in order to provide a dearomatized product having less than 900 ppm of aromatic content and having a pour point of less than 10° C.;
b) Hydroisomerizing the dearomatized product obtained at the end of the hydrodearomatizing step a) at a temperature ranging from 280 to 320° C. and at a pressure ranging from to 60 bars in the presence of a catalyst based on platinum or palladium, in order to provide an isomerized product having a pour point of less than −10° C. and having an initial boiling point below 50° C. and a final boiling point of at least 300° C., being understood that at least 50% by weight of the isomerized product has an initial boiling point of at least 140° C.;
c) Hydrodearomatizing the isomerized product obtained at the end of the hydroisomerizing step b) at a temperature ranging from 150 to 210° C. and at a pressure ranging from 30 to 60 bars, in order to provide an isomerized and dearomatized product having an aromatic content of less than 200 ppm and having a pour point of less than −10° C.;
d) Fractionating the isomerized and dearomatized product obtained at the end of the hydrodearomatizing step c)

into at least two cuts, including one cut having an initial boiling point of at least 140° C., being understood that the biological-origin fluid is the cut having an initial boiling point of at least 140° C. obtained at the end of step d).

The process of the invention can be implemented in a unit, as illustrated in FIG. 1. The feedstock 2 can be premixed with hydrogen 3 and then the feedstock and hydrogen can enter through line 4 into a hydrodearomatization reactor 5. The dearomatized product 6 can then enter through line 7 into hydroisomerization reactor 8. The isomerized product 9 can then enter through line 10 into a hydrodearomatization reactor 11.

According to an embodiment of the invention illustrated in FIG. 1, all the dearomatized products 6 enters the hydroisomerization reactor 8 and all the isomerized products 9 enters the hydrodearomatization reactor 11.

According to an optional embodiment of the invention, the isomerized dearomatized product 12 can then be submitted to a flash separation through line 13 in a flash separator 14 in order to provide separated products 15 (in a liquid form) and gas (mainly remaining hydrogen). According to an embodiment, not illustrated in FIG. 1, the unit of the invention comprises three flash separators in series. According to an embodiment, not illustrated in FIG. 1, gas at the outlet of the flash separator(s) is recycled at the inlet of the unit.

According to an optional embodiment of the invention, the separated products 15 at the exit of the flash separator(s) is then split into two streams: a stream 16 that can be submitted to a fractionation, i.e. a distillation, (not illustrated in FIG. 1) in order to obtain the desired cuts, and a stream 17 that can be recycled at the inlet of the unit, for example, a part of the separated products 15 can be mixed with the feedstock 2.

Isomerized and Dearomatized Fluids Obtained by the Process

The isomerized and dearomatized fluid obtained by the process of the invention has typically an initial boiling point and a final boiling point in the range of from 50 to 400° C., preferably from 60 to 375° C. and has a very low content of aromatics generally less than 300 ppm by weight, preferentially less than 100 ppm by weight and more preferentially less than 50 ppm by weight.

The isomerized and dearomatized fluids produced also have an extremely low sulphur content, less than 5 ppm, preferably less than 3 ppm and more preferentially less than 0.5 ppm, at a level too low to be detectable by means of conventional analyzers that can measure very low sulphur contents.

The isomerized and dearomatized fluids produced preferably has a pour point of less than 0° C., preferably ranging from −90° C. to −1° C., preferably from −85° C. to −5° C., measured according to ISO 3016 standard.

The isomerized and dearomatized fluids also advantageously have:
- a content of naphthenes less than 40% by weight, in particular less than 20% or even less than 10% and/or
- a content of polynaphthenes less than 20% by weight, in particular less than 10% or even less than 5% and/or
- a content of paraffins greater than 10% by weight, in particular greater than 20% or even greater than 30% and/or
- a content of isoparaffins greater than 30% by weight, in particular greater than 50% or even greater than 80%.

Moreover, the isomerized and dearomatized fluids produced have remarkable properties in terms of aniline point or solvent power, molecular weight, vapor pressure, viscosity, defined evaporation conditions for systems for which drying is important and defined surface tension.

According to an embodiment, the fluid obtained in the invention has one or several of the following features:
- a density at 15° C. ranging from 0.7000 to 0.8700 g/mL, preferably from 0.7200 to 0.8600 g/mL, and/or
- a Saybolt colour higher than or equal to +30, measured according to NF M 07003 standard, and/or
- a viscosity at 40° C. ranging from 2 to 25 mm$^2$/s, and/or
- an aniline point of at least 50° C., preferably at least 70° C., measured according to ISO 2977 standard.

In particular, the process of the invention allows to provide fluids having an improved pour point. According to a preferred embodiment, the difference between the pour point of the feedstock (before step a)) and the pour point of the fluids obtained by the process of the invention is of at least 5° C., preferably at least 8° C., more preferably at least 10° C., even more preferably at least 20° C.

The isomerized and dearomatized fluids produced according to an embodiment of the process can be used, alone or in a mixture, as drilling fluids, as industrial solvents, as cutting fluids, as rolling oils, as electro-discharge machining fluids, as rust preventatives in industrial lubricants, as dilution oils, as viscosity reducers in formulations based on plasticized polyvinyl chloride, as crop protection fluids, as white oils.

The isomerized and dearomatized fluids produced according to an embodiment of the process can also be used, alone or in a mixture, in coating fluids, in metal extraction, in the mining industry, in explosives, in mold release formulations for concrete, in adhesives, in printing inks, in metal working fluids, in sealing products or polymer formulations based on silicone, in resins, in pharmaceutical products, in cosmetic formulations, in paint compositions, in polymers used in water treatment, in paper manufacture or in printing pastes or cleaning solvents.

The following example illustrates the invention without limiting it.

EXAMPLES

Example 1: Impact of the Experimental Conditions for the Isomerization Step

The product entering the isomerization reactor is named "dearomatized product" and is detailed in Table 1.

TABLE 1

| | Dearomatized product |
|---|---|
| Initial boiling point (° C.) | 310° C. |
| Final boiling point (° C.) | 365° C. |
| Pour point (° C.) | 9° C. |
| Aromatic content (ppm) | 427 ppm |
| Sulphur content (ppm) | 0.6 ppm |

In the present example 1, the catalyst that has been used is a platinum on silica-alumina catalyst.

Example 1 a: Impact of the Temperature

Isomerization of the dearomatized product obtained in example 1 has been performed at a pressure of bar of hydrogen and with different temperatures ranging from 250 to 300° C., at a LHSV of 1 h$^{-1}$. An isomerized product is then obtained.

The pour point and the aromatic content for different isomerization temperatures have been determined and are indicated in the table 2 below.

TABLE 2

| Isomerization temperature | Pour point of the isomerized product | Aromatic content (ppm by weight) |
|---|---|---|
| 250° C. | 7° C. | 117 ppm |
| 275° C. | 5° C. | 526 ppm |
| 300° C. | −5° C. | 1860 ppm |
| 310° C. | −7° C. | 3444 ppm |

As illustrated in Table 2, the pour point decreases when the temperature of isomerization increases, while the amount of aromatic increases.

The distillation range has also been determined.

Figure 2:
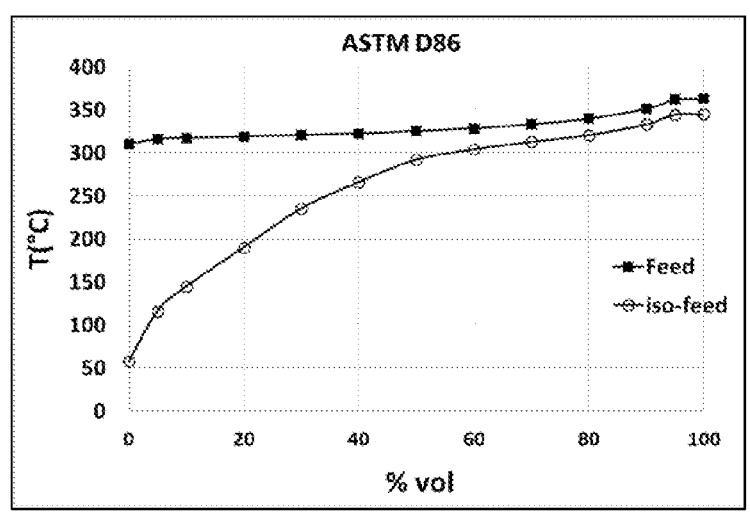
FIG. 2 shows the evolution of the distillation range of the fluids after the isomerization step.

FIG. 2 represents the distillation range measured according to ASTM D86, for the dearomatized product (before isomerization), the isomerized product at a temperature of 300° C.

As illustrated in FIG. 2, the initial boiling point, after the isomerization step, is of about 68° C.

Example 1 b: Impact of the Pressure

Isomerization of the dearomatized product obtained in example 1 has been performed at a temperature of 310° C. and with different pressure of hydrogen ranging from 30 to 50 bar, at a LHSV of 1 $h^{-1}$.

The amount of aromatic and the pour point are indicated in the table 4 below.

The pour point and the aromatic content for different isomerization pressures have been determined and are indicated in the table 3 below.

TABLE 3

| Isomerisation pressure (bar) | Pour point of the isomerized product | Aromatic content (ppm by weight) |
|---|---|---|
| 30 bar | −7° C. | 5780 ppm |
| 40 bar | −6° C. | 3365 ppm |
| 50 bar | −4° C. | 1893 ppm |

As illustrated in table 3, increasing the pressure allows reducing the aromatic content, while the pressure has a little impact on the pour point between the range from 30 to 50 bar.

Example 1c: Impact of the LHSV

Isomerization of the dearomatized product obtained in example 1 has been performed at a temperature of 275° C. or 285° C. and with two different value for the LHSV.

The pour point and the aromatic content for different isomerization LHSV have been determined and are indicated in the table 4 below.

TABLE 4

| Isomerization temperature and LHSV | Pour point of the isomerized product | Aromatic content (ppm by weight) |
|---|---|---|
| 275° C. and 1 $h^{-1}$ | 5° C. | 526 ppm |
| 275° C. and 0.5 $h^{-1}$ | 2° C. | 455 ppm |
| 285° C. and 0.5 $h^{-1}$ | −3° C. | 736 ppm |
| 285° C. and 0.7 $h^{-1}$ | 2° C. | 853 ppm |

As illustrated in table 4, decreasing the LHSV allows improving the pour point and slightly decreasing the aromatic amount.

Example 2: Dearomatization of the Isomerized Product Obtained at the End of Example 1a The isomerized product obtained with an isomerization at 300 and 310° C. (at the end of example 1 a) has been dearomatized at a temperature of 150° C., a pressure of 50 bar and at a LHSV of 1 $h^{-1}$.

TABLE 5

| Isomerization temperature | Pour point after dearomatization | Aromatic content after dearomatization |
|---|---|---|
| 300° C. (see example 1a) | −4° C. | <30 ppm |
| 310° C. (see example 1a) | −6° C. | <30 ppm |

As indicated in table 5, the isomerized and dearomatized product obtained thanks to the process of the invention has a pour point that is substantially reduced, as well as the aromatic content.

A distillation can then be performed in order to form different cuts suitable for different applications.

Example 3: Treatment Process with a Feedstock 1 (Feed1)

A hydrocracked gasoil having the characteristics set out below in table 6 has been dearomatized in a first reactor at a pressure of 50 bar, a LHSV of 1 $h^{-1}$, a ratio H2/HC of 530 Nl/l and a temperature of 210° C. and in the presence of a nickel-alumina catalyst, and then the dearomatized product is isomerized in a second reactor at a temperature of 310° C., a pressure of 50 bar, a LHSV of 1 $h^{-1}$, a ratio H2/HC of 120 or 530 Nl/l and in the presence of a platinum on silica-alumina catalyst. The product features are indicated in table 6 below. After the isomerization step, a hydrodearomatization is performed (on isomerized product defined in table 6) in a third reactor at a pressure of 50 bar, a temperature of 210° C., a LHSV of 1 $h^{-1}$ and a H2/HC ratio from 100 to 700 Nl/l.

TABLE 6

| | Feed1 | Dearomatized product (after step a)) | Isomerized product (after step b)) | Isomerized and dearomatized product (after step c)) |
|---|---|---|---|---|
| Temperature for isomerization | — | — | 310° C. | — |
| Temperature for dearomatization | — | 210° C. | — | 210° C. |

TABLE 6-continued

|  | Feed1 | Dearomatized product (after step a)) | Isomerized product (after step b)) | Isomerized and dearomatized product (after step c)) |
|---|---|---|---|---|
| LHSV | — | 1 h⁻¹ | 1 h⁻¹ | 1 h⁻¹ |
| Initial boiling point (IBP) | 250° C. | 238° C. | 78° C. | NM |
| Final boiling point (FBP) | 368° C. | 365° C. | 363° C. | NM |
| Aromatic content | 16.7% wt | 452 ppm | 2767 ppm | Not detected |
| Pour point | 1° C. | 1° C. | −22° C. | NM |

NM = not measured (will not be substantially modified by the last dearomatization step)

The pour point has been greatly reduced without a deep decrease of the final boiling point. A final fractionation may be performed on the isomerized and dearomatized product in order to select the desired cut.

Example 4: Treatment Process with a Feedstock 2 (Feed2)

A heavy gasoil (Feed2) having the characteristics set out below in table 7 has been dearomatized in a first reactor at a pressure of 50 bar, a LHSV of 1 h⁻¹, a ratio H2/HC of 530 Nl/l and a temperature of 210° C. and in the presence of a nickel-alumina catalyst, and then the dearomatized product is isomerized in a second reactor at a temperature of 310° C., a pressure of 50 bar, a LHSV of 0.5 or 1 h⁻¹, a ratio H2/HC of 530 Nl/l and in the presence of a platinum on silica-alumina catalyst. The product features are indicated in table 7 below. After the isomerization step, a hydrodearomatization is performed (on isomerized product defined in table 7) in a third reactor at a pressure of 50 bar, a temperature of 210° C., a LHSV of 1 h⁻¹ and a H2/HC ratio from 100 to 700 Nl/l.

TABLE 7

|  | Feed2 | Dearomatized product (after step a)) | Isomerized product (after step b)) | Isomerized and dearomatized product (after step c)) |
|---|---|---|---|---|
| Initial boiling point (IBP) | 300° C. | 287° C. | 66° C. | NM |
| Final boiling point (FBP) | 376° C. | 367° C. | 352° C. | NM |
| Aromatic content | 7.6% wt | 185 ppm | 699 ppm | Not detected |
| Pour point | 13° C. | 9° C. | −46° C. | NM |
| Isoparaffins/n-paraffins weight ratio | 2 | NM | 6 | NM |

NM = not measured (will not be substantially modified by the dearomatization step)

Finally, the isomerized and dearomatized product can be subjected to a distillation (fractionation) in order to prepare two cuts: a cut boiling at a temperature of at least 310° C. and a cut boiling at a temperature of at most 310° C.

The invention claimed is:

1. A process for manufacturing a white oil by dearomatization and isomerization of a feedstock having less than or equal to 10 ppm by weight of sulphur, said process comprising:
   a) Hydrodearomatizing a feedstock having an aromatic content of from 5 to 20% wt of aromatic compounds and having a pour point of more than 0° C., at a temperature ranging from 150 to 210° C. and at a pressure ranging from 30 to 60 bars, in order to provide a dearomatized product having less than 750 ppm of aromatic content and having a pour point of more than 0° C.;
   b) Hydroisomerizing the dearomatized product obtained at the end of the hydrodearomatizing step a) at a temperature ranging from 280 to 320° C. and at a pressure ranging from 40 to 60 bars in the presence of a catalyst based on platinum or palladium, in order to provide an isomerized product having a pour point of less than −5° C., being understood that at least 20% by weight of the isomerized product has a boiling point of at least 300° C.;
   c) Hydrodearomatizing the isomerized product obtained at the end of the hydroisomerizing step b) at a temperature ranging from 150 to 210° C. and at a pressure ranging from 30 to 60 bars, in order to provide an isomerized and dearomatized product having an aromatic content of less than 300 ppm and having a pour point of less than −5° C.;
   d) Fractionating the isomerized and dearomatized product obtained at the end of the hydrodearomatizing step c) into at least two cuts, including one cut having an initial boiling point of at least 300° C., being understood that the white oil is the cut having an initial boiling point of at least 300° C. obtained at the end of step d).

2. The process according to claim 1, wherein the feedstock comprises less than 5 ppm by weight of sulphur.

3. The process according to claim 1, wherein the feedstock has an initial boiling point ranging from 120 to 300° C. and a final boiling point ranging from 310 to 600° C.

4. The process according to claim 1, wherein the hydrodearomatization steps a) and/or c) is/are performed in the presence of a catalyst selected from nickel, nickel tungstate, nickel molybdenum, molybdenum, cobalt molybdenate, nickel molybdenate on silica and/or alumina carriers or zeolites.

5. The process according to claim 1, wherein the hydroisomerization step b) is performed in the presence of a catalyst selected from platinum and/or palladium catalysts supported on silica and/or alumina carriers or on zeolites.

6. The process according to claim 1, wherein step a) and/or step c) are performed until a conversion rate of the aromatic compounds of at least 95% by weight is reached.

7. The process according to claim 1, wherein steps a) and/or c) is/are performed at a temperature ranging from 160 to 210° C.

8. The process according to claim 1, wherein step a), step b) and/or step c) is/are performed at a liquid hourly space velocity ranging from 0.4 to 3 hr⁻¹.

9. The process according to claim 1, wherein step a), step b) and/or step c) is/are performed in the presence of a catalyst that is not in a sulfided form when it is contacted with the feed.

10. The process according to claim 1, performed in a unit comprising at least 3 reactors in series, at least one reactor wherein step a) is performed, at least one reactor wherein step b) is performed and at least one reactor wherein step c) is performed.

11. The process according to claim 1, wherein steps a) and/or c) is/are performed at a temperature ranging from 160 to 210° C. and steps a), b) and c) are performed at the same pressure.

12. The process according to claim 4, wherein the catalyst is selected from nickel-based catalysts supported on silica and/or alumina carrier.

13. A process for manufacturing a white oil, said process comprising:
 a) Hydrodearomatizing a feedstock having an aromatic content of from 5 to 20% wt of aromatic compounds and having a pour point of more than 0° C. and having an initial boiling point of at least 120° C. and a final boiling point of at least 300° C., at a temperature ranging from 150 to 210° C. and at a pressure ranging from 30 to 60 bars, in order to provide a dearomatized product having less than 750 ppm of aromatic content and having a pour point of more than 0° C.;
 b) Hydroisomerizing the dearomatized product obtained at the end of the hydrodearomatizing step a) at a temperature ranging from 280 to 320° C. and at a pressure ranging from 40 to 60 bars in the presence of a catalyst based on platinum or palladium, in order to provide an isomerized product having a pour point of less than −5° C. and having an initial boiling point of at least 100° C. and a final boiling point of at least 300° C., being understood that at least 20% by weight of the isomerized product has a boiling point of at least 300° C.;
 c) Hydrodearomatizing the isomerized product obtained at the end of the hydroisomerizing step b) at a temperature ranging from 150 to 210° C. and at a pressure ranging from 30 to 60 bars, in order to provide an isomerized and dearomatized product having an aromatic content of less than 300 ppm and having a pour point of less than −5° C.;
 d) Fractionating the isomerized and dearomatized product obtained at the end of the hydrodearomatizing step c) into at least two cuts, including one cut having an initial boiling point of at least 300° C., being understood that the white oil is the cut having an initial boiling point of at least 300° C. obtained at the end of step d).

14. A process for manufacturing a white oil, said process comprising:
 a) Hydrodearomatizing a feedstock having an aromatic content of from 5 to 20% wt of aromatic compounds and having a pour point of more than 0° C., at a temperature ranging from 150 to 220° C. and at a pressure ranging from 20 to 150 bars, in order to provide a dearomatized product having less than 750 ppm of aromatic content and having a pour point of more than 0° C.;
 b) Hydroisomerizing the dearomatized product obtained at the end of the hydrodearomatizing step a) at a temperature ranging from 280 to 320° C. and at a pressure ranging from 40 to 60 bars in the presence of a catalyst based on platinum or palladium, in order to provide an isomerized product having a pour point of less than −5° C. and having an initial boiling point of at least 100° C. and a final boiling point of at least 300° C., being understood that at least 20% by weight of the isomerized product has a boiling point of at least 300° C.;
 c) Hydrodearomatizing the isomerized product obtained at the end of the hydroisomerizing step b) at a temperature ranging from 150 to 220° C. and at a pressure ranging from 20 to 150 bars, in order to provide an isomerized and dearomatized product having an aromatic content of less than 300 ppm and having a pour point of less than −5° C.

15. The process according to claim 14, further comprising a fractionating step.

16. The process according to claim 14, further comprising a fractionating step performed after the hydrodearomatization step c).

* * * * *